United States Patent [19]

Wahl et al.

[11] 4,273,236

[45] Jun. 16, 1981

[54] METHOD AND APPARATUS FOR HANDLING BOTTLES

[75] Inventors: Alois Wahl; Paul Elsner, both of Bad Kreuznach; Gerhard Born, Bingen, all of Fed. Rep. of Germany

[73] Assignee: Seitz-Werke GmbH, Bad Kreuznach, Fed. Rep. of Germany

[21] Appl. No.: 34,166

[22] Filed: Apr. 27, 1979

Related U.S. Application Data

[63] Continuation of Ser. No. 851,422, Nov. 4, 1977, abandoned, which is a continuation of Ser. No. 675,887, Apr. 12, 1976, abandoned.

[30] Foreign Application Priority Data

Apr. 22, 1975 [DE] Fed. Rep. of Germany ....... 2517757

[51] Int. Cl.³ ........................................... B65G 47/26

[52] U.S. Cl. ..................................... 198/432; 198/407

[58] Field of Search ............... 198/426, 427, 432, 434, 198/443, 445, 447, 857, 817, 482, 483, 485, 487, 489, 839, 408, 457, 407, 406

[56] References Cited

U.S. PATENT DOCUMENTS

| | | | |
|---|---|---|---|
| 2,371,877 | 3/1945 | Crosland | 198/457 X |
| 3,178,005 | 4/1965 | Read | 198/407 |
| 3,305,065 | 2/1967 | Babunovil | 198/408 |

*Primary Examiner*—Robert B. Reeves
*Assistant Examiner*—Douglas D. Watts
*Attorney, Agent, or Firm*—Becker & Becker, Inc.

[57] ABSTRACT

A method and apparatus for handling bottles, especially for handling bottles which are discharged from a treatment machine in which the bottles are discharged in groups from the treatment machine, each group consisting of a row of adjacent bottles discharged from the machine in a direction perpendicular to the length of the row. A conveyor extending at an angle of about 95 degrees to the direction of movement of each row is disclosed adjacent the treatment machine. The rows of bottles are successively discharged from the treatment machine to the conveyor and are deposited on the conveyor in rows which are parallel and spaced and which extend from side to side of the conveyor at an acute angle to the direction of movement of the conveyor. The conveyor is advantageously formed of a plurality of parallel belts having a common drive.

7 Claims, 6 Drawing Figures

METHOD AND APPARATUS FOR HANDLING BOTTLES

This is a straight continuation of co-pending application Ser. No. 851,422-Wahl et al filed Nov. 4, 1977, which in turn is a continuation of Ser. No. 675,887-Wahl et al filed Apr. 12, 1976 (both now abandoned).

The present invention relates to a method of transporting away bottles and the like on the transport conveyor of bottle treating machines, especially bottle cleaning machines, and also concerns a transport conveyor for practicing this method.

In general vessel treating machines built as a longitudinally extending machine, especially bottle cleaning machines, are in the region of the bottle discharge equipped with a conveyor having one or more lanes and extending in a direction transverse to the longitudinal direction of the machine. In this connection it is customary to feed the bottles which after their discharge from the machine have been placed in rows on a horizontal depositing surface one after the other in the direction of the longitudinal axis of the machine toward the transport conveyor while retaining the thus formed rows. Normally the feeding and transfer of the rows of bottles to the transport conveyor is effected by means of transfer elements in the form of slides or cam slides or other devices which are movable vertically or at an incline. The transport of the bottles after their transfer to the transport conveyor out of the range of the machine is effected with one lane conveyors in rows one after the other. Hereby the rows of bottles remain always complete and from the transport conveyor are transported on a one-lane conveyor to a subsequent treating machine, for instance, to a filling machine. In this connection the speed of the transport conveyor is so selected that the transfer of a row of bottles is effected only after the preceding row has been transported away from the transfer region.

With multi-lane transport conveyors with which the transfer of the rows of bottles is effected in the same manner, for purposes of increasing the discharge and transport output at the same belt speed, there exists the tendency for transporting the bottles to split up a respective row of bottles into a plurality of short rows and to transfer the shortened rows to a belt of the transport conveyor. It is known to effect the distribution of the plurality of rows onto the individual lanes of the transport conveyor by means of an inclined transfer plate which is arranged in the central portion of the conveyor. The arrangement is such that, when viewed in the direction of movement of the conveyor, the respective rear portion of a row of bottles is by this transfer plate guided onto a second or other track or lane of the transport conveyor which second lane is arranged parallelly and farther away from the machine. In this connection the drawback is encountered that half of the bottles have to press wall to wall against the transfer plate and against each other whereby considerable noise develops which inconveniences the operator of the machine. To avoid this drawback, a bottle discharge device has been proposed according to which the bottles deposited in rows are by means of a step-shaped slide or by a plurality of slides offset relative to each other divided up into a number of short rows which corresponds to the number of steps or slides and when being transferred are deposited upon the respective belt associated with each step or slide.

Aside from the numerous structural elements necessary for the complicated construction of the slide system and their long stroke driving elements, the primary drawback to this known discharge device consists above all in that the speed of the conveyor belts for transporting the short rows of bottles in a row one after the other must be relatively high in order to assure that a short row of bottles conveyed by the belt will not be impeded by a subsequently conveyed short row of bottles. Another disadvantage of this known machine consists in that due to the different speeds at which the surfaces engaging the bottles, especially the surfaces of the one-piece step-shaped slide, impact upon the bottles standing in readiness for the transport considerable breakage of bottles occurs and considerable noise is created which inconveniences the operator and which is further increased by the fact that during the transfer of the short rows of bottles to the respective belts the bottles of these rows will under the influence of the belts already grasping during the slide stroke lose their distance from each other and and move against each other.

It is, therefore, an object of the present invention to transfer the discharged rows of bottles undivided and in their entire length without contact between the successive rows of bottles or between individual bottles onto a multi-lane conveyor for transporting the bottles away from the region of the discharge of the bottles from the machine and from the machine itself and to transport the bottles on this conveyor without the necessity first to transport away a previously transferred row of bottles before a successive row of bottles is transported away from the discharge region.

This object and other objects and advantages of the invention will appear more clearly from the following specification in connection with the accompanying drawings, in which.

Figure 1:
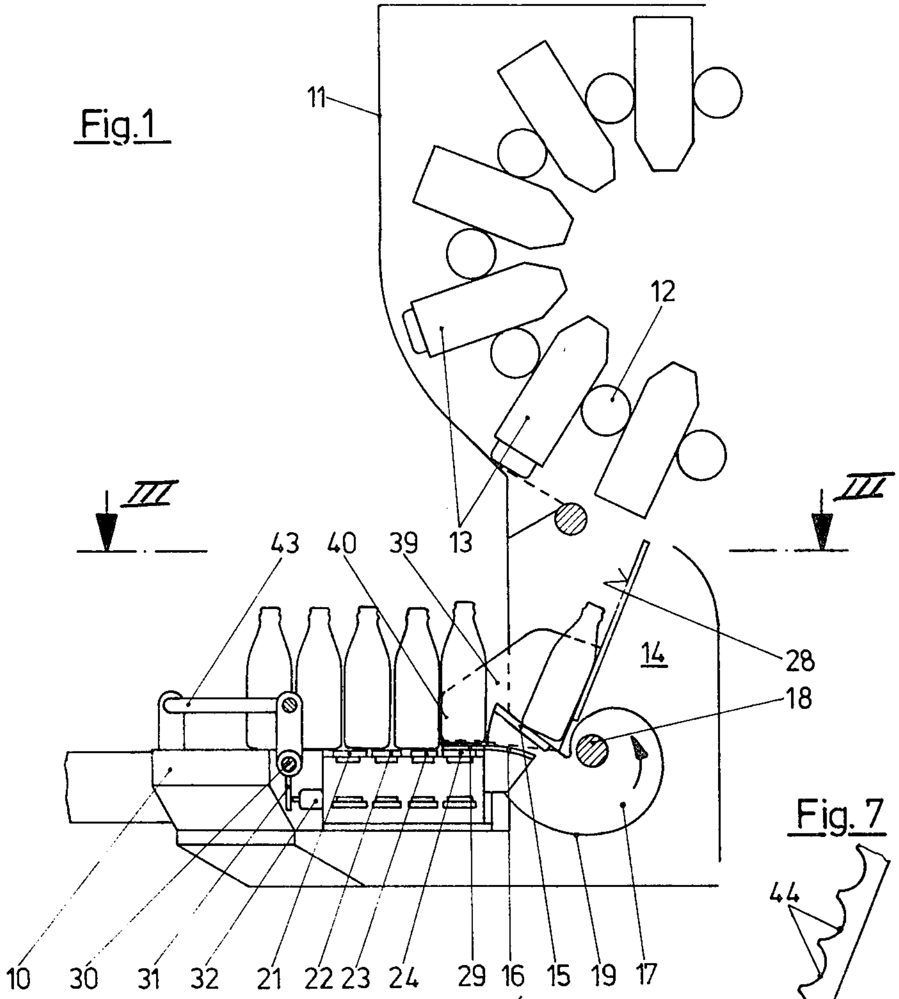
FIG. 1 illustrates a bottle discharge device with a conveyor as seen from the side and taken along the section I—I of FIG. 3.

The above outlined object has been realized according to the present invention by a method which is characterized primarily in that the rows of bottles which are one after the other by the transfer elements transferred to the multi-lane conveyor are on the latter transported along straight lines which intersect at an acute angle the longitudinal axis of the conveyor which axis extends in the transporting direction while in the direction of the straight lines the rows of bottles are displaced relative to each other by distances of the same length. In view of this type of transport of the complete rows of bottles which are offset relative to each other in their longitudinal directions and extend obliquely to the transporting direction, any transverse displacements on the conveyor are avoided, and the bottles are with a minimum of noise development and without a piling-up pressure removed from the region of the machine. For this primary object of noise abatement in the region of the bottle discharge it is suggested according to the present invention that the distance between the bottles necessary to assure a non-engagement of bottles of neighboring rows of bottles be determined by the mutual spacing between the rows of bottles in the transporting direction of the conveyor.

According to a further development of the invention this mutual distance of the rows of bottles in the transporting direction of the transport conveyor is effected in conformity with the timewise sequence of the transfer of the rows of bottles onto the transport conveyor by controlling its belt speed.

According to the invention the transporting direction of the conveyor extends from the bottle transfer at an angle one leg of which coincides with the longitudinal axis of the machine whereas the other leg coincides with the longitudinal axis of the conveyor. Expediently, for this angle an angle of 95° is selected. If a larger angle is selected, the belt speed can be reduced in conformity with this increase in the angle over 95°.

For practicing the method according to the invention, a multi-lane conveyor is provided which is characterized in that it is composed of a plurality of parallel conveyor belts which are driven by a common drive at the same speed and are composed in such a way that they together furnish a plane transporting surface. These conveyor belts coincide with the longitudinal axis extending in the transporting direction and at an angle of 95° with regard to the longitudinal axis of the machine lead away from the bottle transfer. The reversing stations of the conveyor belts in the vicinity of the machine are staggered in the region of the depositing surface of the bottle transfer and are covered in the curved region of the belt reversal by a sliding plate which precedes the depositing surface at the same level.

According to a further development of the invention there are provided vertical walls which extend over the sliding plate and the depositing surface and are arranged with the same spacing as the bottle rows. These vertical walls respectively extend to the transporting surface of the conveyors and hold the bottles of the respective fed row of bottles in spaced relationship to each other until they are transferred.

Furthermore, according to the invention, the reversal station adjacent the machine is relative to the reversal station of the conveyor located outside the range of the machine and is equipped with the common belt drive. According to the invention the conveyor on that side which is located opposite the sliding plate comprises a safety rail which responds to a bottle pile-up and actuates a switch which turns off the machine.

Referring now to the drawings in detail, the conveyor 10 is a component of a bottle cleaning machine 11 which is equipped with circulating conveyor chains 12 and bottle boxes or containers 13. The discharge end of the bottle cleaning machine 11 is respectively illustrated in FIGS. 1 and 2 in two different embodiments. With both embodiments, the conveyor 10 is preceded by a discharge device 14 which primarily comprises a member 15 for moving the bottles downwardly which are discharged from the bottle containers 13. The discharge device 14 furthermore comprises a horizontal depositing surface 16 and one or more members 19 for transferring the deposited bottles to the conveyor 10.

With the embodiment of FIG. 1, the downwardly guiding member 15 comprises the depositing surface of a cam 17, and the transfer member 19 comprises the spiral-shaped rim of cam 17. Cam 17 is for each bottle together with further cams 17 mounted on a common shaft 18. An inclined sliding plate 28 leads to the depositing surface 15. This plate 28 has its upper end extending into the region of a bottle container 13 ready for discharge. For aiding in the discharge, at both sides of a cam or disc 17 there are provided vertical partitions 39 for maintaining the mutual distance between the bottles within a row of discharged bottles. The front edge 40 of the partitions 39 assures a rolling off of the bottles transferred to the conveyor 10 in rows one adjacent the other. The partitions 39 (FIGS. 5 and 6) may be made of sound absorbing material.

Figure 7:
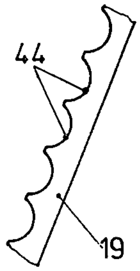
FIG. 7 illustrates a detail of the discharge device of FIG. 2 as seen in the direction of the arrow VII of FIG. 2.
Figure 2:
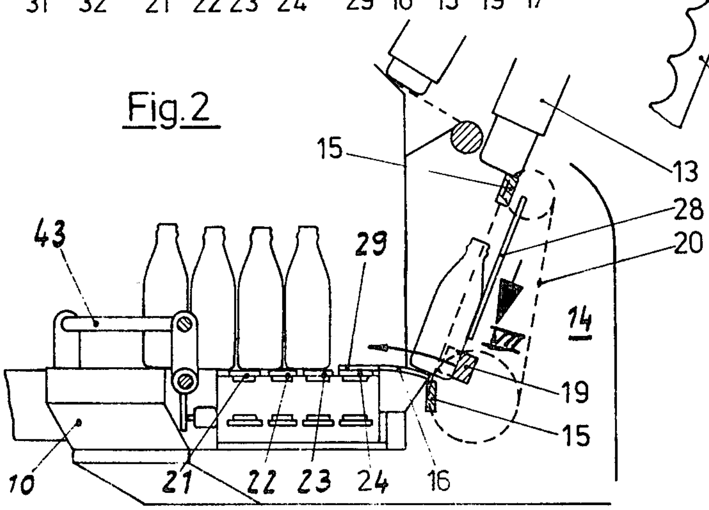
FIG. 2 shows a view similar to that of FIG. 1 of a modified discharge device with conveyor.

According to the embodiment of FIG. 2, the downwardly guiding member 15 comprises one or more horizontal beams which are connected to oppositely arranged endless drives 20 and on which the upright supported bottles are moved to the depositing surface 16. The transfer member 19 is in this instance formed by an additional beam which is moved forwards and backwards in the longitudinal direction b of the machine (FIG. 4) by a non-illustrated lifting device. The beam 19 may, as shown in FIG. 7, be provided with recesses 44 which act in the manner of the partitions 39 referred to above.

Figure 3:
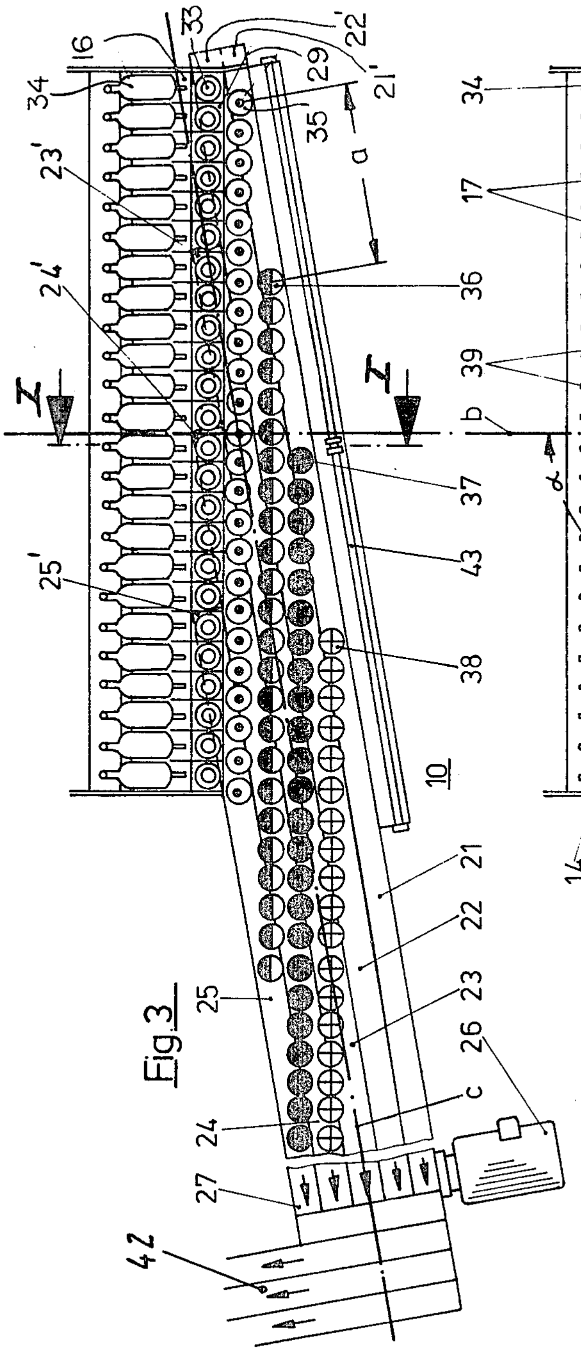
FIG. 3 is a top view of the discharge device of FIG. 1 as seen along the line III—III of FIG. 1.
Figure 4:
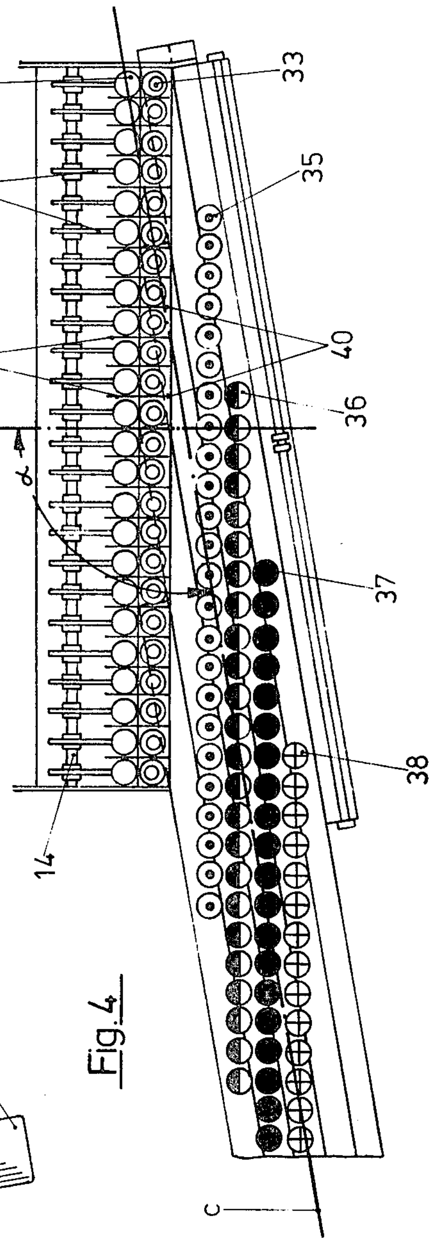
FIG. 4 is a further top view of the discharge device of FIG. 1.

With both embodiments of the discharge device, the conveyor 10 is composed of a plurality of endless parallel conveyor belts 21, 22, 23, 24 and 25 which are combined to a plane transporting surface and which circulate at the same speed. A variable drive 26 effects the common circulation of the conveyor belts. As will be seen from FIG. 3, the drive 26 is arranged on a reversing station 27 of the conveyor 10, the reversing station 27 being remote from the machine 16 and its discharge device 14. The conveyor 10 extends in transporting direction at an incline to the discharge device 14 at an angle $\alpha$. One leg of the angle $\alpha$ coincides with the longitudinal axis c of the conveyor 10. In this way the longitudinal axis c of the conveyor 10 which axis c extends in the transporting direction, and the longitudinal axis of the individual belts 21, 22, 23, 24 and 25 intersects the longitudinal axis b of the machine (FIG. 4). With this inclined arrangement of the conveyor 10 and its belts 21, 22, 23, 24 and 25 which lead away from the bottle discharge 14, the reversing stations 21', 22', 23', 24' and 25' which are adjacent the machine have the stations 22', 23', 24' and 25' staggered in the region of the depositing surface 16 of the discharge device 14. These staggered stations are in the curved region of the belt reversal covered by a sliding plate 29 which extends over the width of the discharge device 14 and is arranged at the same level as the depositing plate 16. In this arrangement, expediently the stations 21' and 22' are combined.

For bottle sizes having a diameter of from 55 to 120 mm, the angle $\alpha$ expediently amounts to 95° whereby a particularly advantageous bottle feeding to the conveyor 10 will be assured.

The conveyor 10 has that side thereof which is located opposite the discharge device 14 equipped with a safety rail 43 which confines the belt 21 which is remote from the machine over the width of the machine. As will be seen from FIG. 1, this safety rail 43 is pivotable about a pivot point 30 and is adapted by means of a lever 31 to act on a machine switch 32, especially when the bottles pile up. The described arrangement and design of the conveyor 10 permits the removal of the bottles discharged by the discharge device of FIG. 1 in the following manner.

Figure 5:
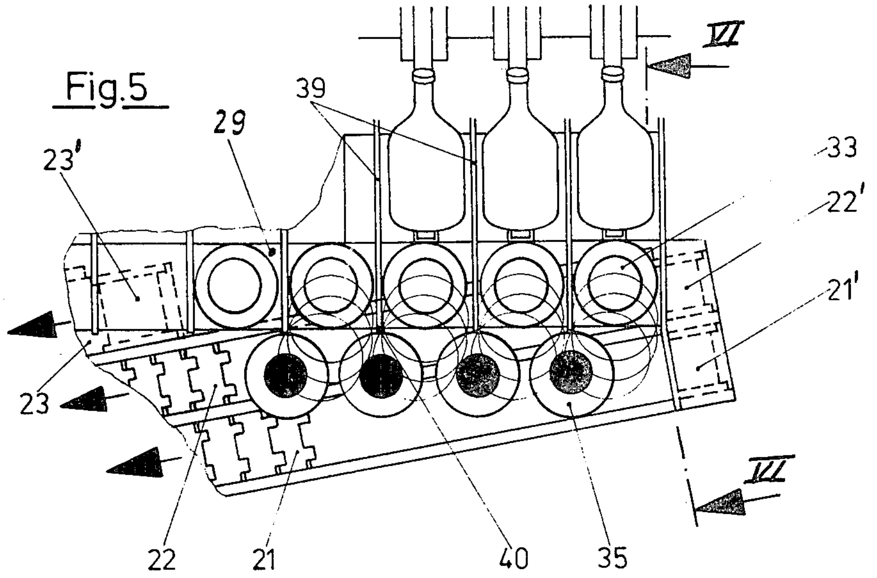
FIG. 5 illustrates a detail of the discharge device of FIG. 3.
Figure 6:
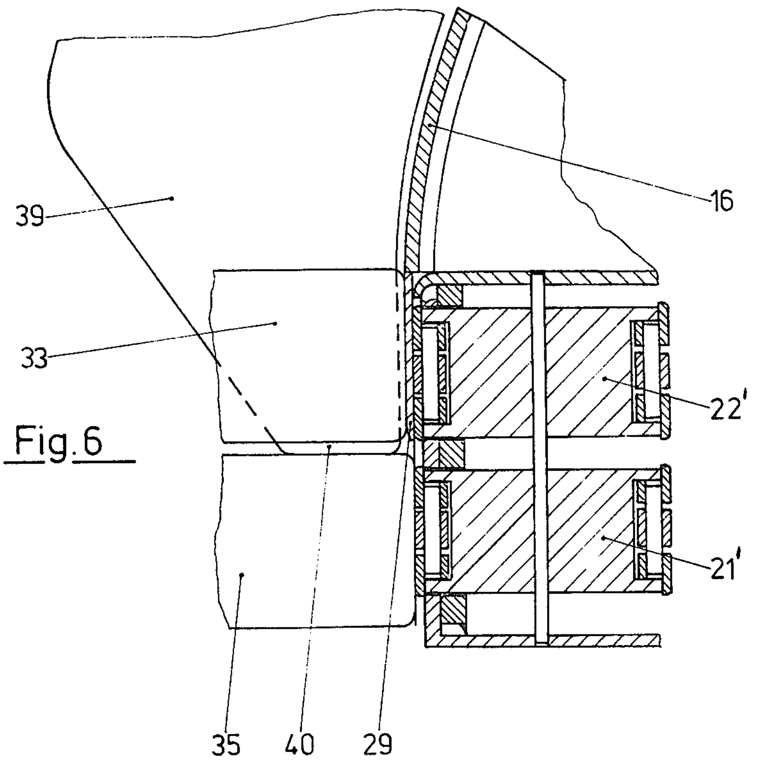
FIG. 6 shows in section a detail of the arrangement of FIG. 5, said section being taken along the line VI—VI of FIG. 5.

As will be seen from FIG. 1, the bottles which are fed in rows in a bottle container 13 from the treatment station of the machine to the discharge device 14 are after leaving the container 13 and after freely falling along the sliding plate 28 respectively received by the surface 15 of the cam disc 17. During the rotation of cam disc 17 in the direction of the arrow, the bottles are subsequently deposited upon the depositing surface 16 and are then advanced from the marginal portion 19 of cam disc 17 onto the sliding plate 29. The thus discharged row of bottles which in FIGS. 3 and 4 is designated with the reference numeral 33 and the bottles of which are indicated by double circles remains on the sliding plate 29 until it is by the bottles (indicated by open circles) of the subsequently discharged row of bottles 34 transferred via plate 29 onto the conveyor 10. In this connection the bottles will under the influence of the respectively attacking belts 21, 22, 23, 24 and 25 (as shown in FIG. 5) roll off at the front edges 40 of the partitions 39 and will subsequently be located in a row one adjacent to the other on the conveyor 10, this row being designated with the reference numeral 35. When thereafter row 35 in the transporting direction of the conveyor 10 which transporting direction extends at an angle $\alpha$ to the longitudinal machine axis b has moved over the distance a and has reached the position of the row of bottles designated with the reference numeral 36, the subsequently discharged row of bottles 34 which in the meantime has reached the position of row 33 on sliding plate 29 passes from plate 29 onto the conveyor 10 and assumes the position previously held by row 35. In this position, the row of bottles 34 is located opposite and parallel to the previously discharged row of bottles 36 while it is longitudinally offset with regard to the bottle row 36. As a result thereof, the bottles of one row are located opposite to a gap between the bottles of the other row. Both rows of bottles 35 and 36 will during a further transport during which the rows of bottles are inclined to the transporting direction of the conveyor 10 maintain their respective position up to the end 27 of conveyor 10 which is remote from the machine and where the rows of bottles are transferred to a conveyor belt 42 leading to a succeeding treating machine. In other words, the rows of bottles 35 and 36 retain the position which already existed between the previously discharged and transported rows 37 and 38. The spacing between the bottles of adjacent rows of bottles 35 and 36 as well as between the remaining rows of bottles 37 and 38 is determined by the respective length of the distance a and is adjustable in conformity with the respective rate of transfer of rows of bottles per time unit by a corresponding belt speed which is adapted to be controlled at the drive 26.

Also the bottle transport with the discharge device of FIG. 2 which device is provided with pushing beams 19 as transfer members, is effected in the above described manner. The difference merely consists in that a row of bottles engaged by a pushing beam 19 is directly transferred to the conveyor 10 and thus does not remain on the sliding plate 29 until the next row of bottles arrives.

The angle $\alpha$ of the conveyor 10 may, of course, exceed 95°; with increasing angle, the belt speed may then be reduced in conformity with the increase of the angle $\alpha$.

It is, of course, to be understood that the present invention is, by no means, limited to the specific showing in the drawings but also comprises any modifications within the scope of the appended claims.

What is claimed is:

1. In a system for transferring bottles discharged from a machine in long rows of laterally spaced bottles to substantially shorter rows of laterally spaced bottles on a linear conveyor, the conveyor system for conveying away upright beverage bottles of glass as a reusable packaging container distinct from flat edible food cakes and maintained upright when moving along at an angle, comprising in combination therewith a bottle treatment machine having means to transport bottles in spaced, parallel rows in a direction perpendicular to said rows and to discharge said bottles in upright position one row at a time in succession, a linear conveyor having a plurality of parallel adjacent belts with a common drive for movement of said belts at a common speed, the direction of travel of said conveyor being at an acute angle to said parallel rows of upright beverage bottles of glass in said machine and at an angle greater than 90° to the direction of movement of said rows of upright beverage bottles of glass in said machine to move said upright beverage bottles of glass by pushing at an equal level height away from said machine, said belts at the upstream end of the upper reach thereof adjacent said machine having staggered reversing supports, a stationary plate extending over the upstream ends of the upper reaches of said belts at the discharge position, means to receive said upright beverage bottles of glass deposited by said machine one row at a time, means to move each row of upright beverage bottles of glass onto said plate at right angles to said row and to displace the preceding row of upright beverage bottles of glass on said plate to move onto said linear conveyor at an acute angle to the direction of travel of said conveyor with each said row extending from side to side of said linear conveyor at said acute angle, said linear conveyor moving at substantially greater speed than the movement of said rows of upright beverage bottles of glass from said machine such that a plurality of upright beverage bottles of glass in each row of bottles discharged onto said linear conveyor move away from the discharge position before the discharge of the next succeeding row of upright beverage bottles of glass, the speed of discharge being such that upon transferring of a row of upright beverage bottles of glass, generation of noise due to bumping of upright beverage bottles of glass into the upright beverage bottles of glass in the row previously transferred in upright position is avoided.

2. A conveyor system in combination as claimed in claim 1, in which said conveyor extends in the direction of its travel at an angle of 5° to said support and the row of upright beverage bottles of glass on said support.

3. A conveyor system in combination as claimed in claim 1, in which the direction of travel of said conveyor is at an acute angle of 5° to said parallel rows of upright beverage bottles of glass.

4. A conveyor system in combination as claimed in claim 1, in which partitions between said upright beverage bottles of glass in each row deposited by said machine and the upright beverage bottles of glass in each row on said plate are so positioned that the upright beverage bottles of glass in each row are spaced when moved onto said conveyor, said conveyor moving each row of upright beverage bottles of glass from said plate before the next succeeding row is deposited, so that said row of upright beverage bottles of glass are spaced on said conveyor.

5. In a system according to said plate comprising a stationary support extending across said conveyor adjacent one end at said acute angle and parallel to said rows of bottles.

6. In a system according to claim 1 which includes an apparatus for discharging said bottles from said linear conveyor at an obtuse angle to said rows of discharged bottles and of substantially less width than said rows of discharged bottles to receive said rows at an acute angle on said conveyor, and of a width to accommodate a row of bottles of less length than said rows of discharged bottles, said conveyor moving at a higher speed than the linear speed of said apparatus for discharging said bottles to move said rows of laterally spaced bottles away from successively discharged rows of bottles to provide spaced rows of bottles on said conveyor, so that said linear conveyor may deliver the bottles laterally spaced in short rows at an angle to said linear conveyor.

7. In a system according to claim 6, in which the apparatus for discharging said bottles causes a successive row of bottles to engage the preceding row to move said preceding row onto said linear conveyor, said conveyor moving at the greater speed to move said preceding row away from the successively discharged row.

* * * * *